US 9,411,507 B2

(12) United States Patent
Moore (10) Patent No.: US 9,411,507 B2
(45) Date of Patent: Aug. 9, 2016

(54) SYNCHRONIZED AUDIO FEEDBACK FOR NON-VISUAL TOUCH INTERFACE SYSTEM AND METHOD

(71) Applicant: Toyota Motor Engineering & Manufacturing North America, Inc., Erlanger, KY (US)

(72) Inventor: Douglas A. Moore, Alameda, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 350 days.

(21) Appl. No.: 13/633,806

(22) Filed: Oct. 2, 2012

(65) Prior Publication Data

US 2014/0092032 A1 Apr. 3, 2014

(51) Int. Cl.
G06F 3/041 (2006.01)
G06F 3/0488 (2013.01)
G06F 3/16 (2006.01)

(52) U.S. Cl.
CPC ............ G06F 3/04883 (2013.01); G06F 3/167 (2013.01)

(58) Field of Classification Search
CPC ............................ G06F 3/04883; G06F 3/167
USPC ................................................ 345/172–174
See application file for complete search history.

(56) References Cited

U.S. PATENT DOCUMENTS

| | | | |
|---|---|---|---|
| 5,767,457 A | 6/1998 | Gerpheide et al. | |
| 6,703,550 B2 | 3/2004 | Chu | |
| 6,882,337 B2 | 4/2005 | Shetter | |
| 7,269,484 B2 | 9/2007 | Hein | |
| 7,924,271 B2 | 4/2011 | Christie et al. | |
| 2004/0169674 A1 | 9/2004 | Linjama | |
| 2007/0242056 A1 | 10/2007 | Englelhardt et al. | |
| 2009/0273571 A1* | 11/2009 | Bowens | 345/173 |
| 2010/0328224 A1 | 12/2010 | Kerr et al. | |
| 2011/0082618 A1 | 4/2011 | Small et al. | |
| 2011/0090407 A1 | 4/2011 | Friedman | |
| 2011/0107216 A1 | 5/2011 | Bi | |
| 2011/0163944 A1 | 7/2011 | Bilbrey et al. | |
| 2011/0191675 A1* | 8/2011 | Kauranen | 715/702 |
| 2011/0209090 A1 | 8/2011 | Meyvis et al. | |
| 2011/0291954 A1* | 12/2011 | Djavaherian | 345/173 |
| 2012/0019465 A1 | 1/2012 | Chen et al. | |
| 2012/0032896 A1* | 2/2012 | Vesely et al. | 345/173 |
| 2012/0110517 A1 | 5/2012 | Sparks et al. | |
| 2012/0188285 A1* | 7/2012 | Friedlander et al. | 345/660 |
| 2012/0229410 A1* | 9/2012 | Ohashi | 345/173 |
| 2013/0120282 A1* | 5/2013 | Kukulski | 345/173 |
| 2015/0097786 A1* | 4/2015 | Behles et al. | 345/173 |

* cited by examiner

Primary Examiner — Quan-Zhen Wang
Assistant Examiner — Tony Davis
(74) Attorney, Agent, or Firm — Snell & Wilmer LLP (57) ABSTRACT

The disclosed systems and methods are directed to interfaces, and more particularly, to an audio feedback system for touch interface. This touch interface allows a user to interact with a touchscreen without a priori knowledge of where items are located on the touchscreen or even the relative orientation of that touchscreen. For instance, this interface may operate responsive to relative offset between touches.

19 Claims, 4 Drawing Sheets

SYNCHRONIZED AUDIO FEEDBACK FOR NON-VISUAL TOUCH INTERFACE SYSTEM AND METHOD

FIELD

The present disclosure relates to non-visual interfaces, and more particularly, to an audio feedback system associated with a touch interface.

BACKGROUND

In general, at present there are many methods for a computer system to receive an input. For example, a keyboard, mouse, rollerball, joystick, touchpad and touchscreen may be used to interact with and command elements of a computer system. Likewise, there are instruments that associate audio feedback with touch input such as a keyboard and drum machine. Currently the preferred method of interaction with present smart phones and tablets is through touch and gestures. This system presents advantages over prior mouse and external keyboard applications. However, this present popular interaction technique presents a problem for blind, visually impaired and distracted users, whom cannot see graphics presented on a display. For instance, initially knowing the orientation and location of items on a screen, learning "shapes", and general touchscreen interaction are not intuitive. What is needed is a natural intuitive interaction system and method. Also, an interaction method providing feedback, such as self-reaffirming audio feedback is needed.

SUMMARY

The above needs are successfully met via the disclosed system and method. The present disclosure is generally directed to a touch interface, and more particularly, to an audio feedback system associated with a touch interface. This touch interface allows a user to interact with a touch screen without requiring a priori knowledge of where (if any) items, such as icons are located on a screen or even the relative orientation of that screen.

In accordance with various embodiments, the present system and method provide audio feedback for tapping gestures on a touchscreen to allow users to input commands without having to look at the screen. The audio sounds played have a relationship to the relative touch locations of the tapping and/or touches. Thus, users, such as blind or visually impaired users, may interact with a touchscreen interface with limited knowledge of traditional gestures, shapes and motions. By assigning feedback, such as audio and/or haptic feedback, to a touch input and/or a series of touch inputs all having relative location, users can interact with a touch interface without having to see the orientation of the screen or visually identify items on the screen for interaction.

In various embodiments, this relative location interaction does not involve haptic or tactile feedback aside from the natural touch of the user's finger on the screen. Likewise, while the present disclosure presents various advantages for blind and visually impaired users, the systems and methods disclosed herein are not limited to blind and/or visually impaired users. For instance, distracted users, such as drivers of a vehicle may avail themselves of various aspects of the present disclosure.

In various embodiments, the present system and method is an improvement over the current technology in that it allows a user to interact with a touch surface interface without requiring visual attention for confirmation of actions. It allows complex command actions beyond a simple tap, double tap or dragging of an icon. The present system and method also pairs discrete tapping gestures to audio feedback which can give confirmation and reinforcement learning to input actions.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

DETAILED DESCRIPTION

In the following detailed description, numerous specific details are set forth to provide an understanding of the present disclosure. It will be apparent; however, to one of ordinary skill in the art that elements of the present disclosure may be practiced without some of these specific details. In other instances, well-known structures and techniques have not been shown in detail to avoid unnecessarily obscuring the present disclosure.

Figure 3:
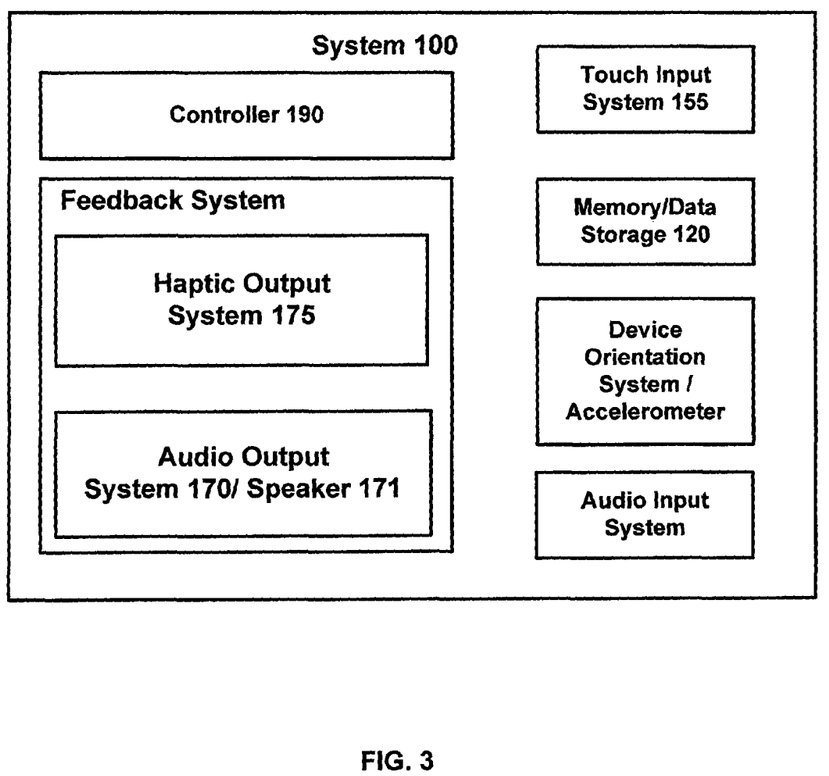
FIG. 3 illustrates an overview of a computer based system according to various embodiments.

The present disclosure is generally directed to interaction, and more particularly, to an interactive computer system 100 having a touch based input system 155 responsive to inputs having relative locations. As used herein, relative location comprises a location of a place in relation to another place. In various embodiments, this touch based input system 155 may comprise a touchscreen 110 capable of communicating information (and/or a touchpad 105).

Touchscreen 110 may comprise an interface circuit which includes those components, whether embodied in software, firmware, or hardware, which are used to interpret the position information obtained from touch screen 110 to industry standard signals understandable by the coupled computer based system 100. The computer based system 100 may include a controller 190, component or driver, to interpret the signals received from touchscreen 110. Alternatively, those skilled in the art can arrive at many other techniques for touchscreen 110 to communicate with computer based system 100.

Touchscreen 110 may be operated directly, such as with a finger, stylus or portions of the hand, without the need for an intermediate device (e.g. microphone, keyboard, mouse). Thus, a mouse or keyboard is not required to interact with touchscreen 110. Touchscreen 110 may be any suitable touchscreen. For instance, touchscreen 110 may be utilize resistive, surface acoustic wave (SAW), capacitive, surface capacitance, projected capacitance, mutual capacitance, self-capacitance, and/or infrared optical imaging technologies for registering inputs/commands.

Interactive computer system 100 may be integral to and/or coupled to a hand held device, similar to a tablet device, a fixed device and/or semi-permanently located device. According to various embodiments, rich menu navigation without visual attention is achieved via system 100.

As disclosed herein, input system 155 comprises touchscreen 110 configured to be responsive to touch based gestures. Any pointing device, such as a user's finger, can easily and conveniently be used to touch a surface 160 of the touchscreen 120. In various embodiments, touchscreen 110 is configured to display graphics and/or text. Also, as various aspects of the present disclosure are directed to sightless and visually impaired users, touchscreen 110 may not display graphics and/or text. In this way, touchscreen 110 and/or touchpad 105 may be made from more robust materials. The present system 100 may also comprise an audio feedback system 170. This audio feedback system 170 may comprise any suitable audio feedback. For instance, audio feedback system 170 may comprise speakers 171, headphones and/or speakers coupled to an audio output port and/or the like. The present system 100 may also comprise a memory 120 for storing input, timing and commands associated with touch based gestures having relative locations. This memory may be a RAM memory, flash memory, ROM memory, EPROM memory, EEPROM memory, registers, hard disk, a removable disk, a CD-ROM, or any other form of storage medium known in the art.

In various embodiments, an algorithm, such as an algorithm stored to memory 120, may be configured to interact with touchscreen 110 hardware where initial touch, relative offset, direction of offset, timing between touches, progression of touches and/or audio feedback are all used to aid interaction with a computer based system, such as to aid in computer based menu navigation and action selection.

In various embodiments, non-audio feedback may be presented in addition to audio feedback and/or in lieu of audio feedback. Thus, system 100 may comprise a haptic response system 175. For example, haptic response system 175 may cause device and/or system 100 and/or elements of device and/or system 100 to vibrate when touchscreen 110 is tapped. The feedback of haptic response system 175 may be constant and/or vary in intensity and/or duration based on different inputs/commands and/or relative offset gestures received, as disclosed herein. This haptic feedback may be applied in a case-by-case basis and/or responsive to a user selection.

In various embodiments, the shape of the interactive computer system 100 may aid a user in determining the initial orientation of touchscreen 110. For instance, a distinctive shape of the perimeter of interactive computer system 100 may aid a user in determining initial orientation. For example, device 100 may be shaped with a narrow top and a wide base, similar to a trapezoid so that a user may instantly be able to determine the orientation of the device.

In various embodiments, such as with a hand held interactive computer system 100, a motion sensor integral to system 100, such as an accelerometer, may aid orienting device 100 for a user. For instance, the user need only hold system 100 upright and the device will reorient the orientation of touchscreen 110 accordingly.

In various embodiments, interactive computer system 100 may comprise a tactile indicator to indicate a starting orientation of device 100 similar to the raised elements on the "F" and "J" keys on the home row of a traditional QWERTY keyboard. This tactile indicator may be located on any location on device 100, such as the top, side, edge, side, back, on touchscreen 110 and/or the like. According to various embodiments, other tactile surface characteristics may be used to assist the user to determine system 100 orientation. For example, device 100 may have a soft surface feature near its top and/or a rough surface features near its bottom, and/or the like.

In various embodiments, such as when system 100 is located in a fixed position, such as the center console of a vehicle, the initial orientation of touchscreen 110 may be known based on prior use. According to various embodiments, system 100 may be coupled to and/or integral to at least one of a mobile device (e.g. mobile phone, tablet), computer, robot, home appliance, tool and/or toy.

Though the feedback presented to a user in response to interaction with touchscreen 110 may comprise any audio and/or haptic feedback, in accordance with aspects of the present disclosure, unique feedback is presented to the user based on the unique commands input to system 100, such as relative location based commands. For instance, inputs to touchscreen 110 comprising variations in time between touches, force of a touch, number of sequential touches in a relative location, type of slides/drags in combination with relative location, relative distance from a reference touch, time for a sequence of touches and/or slides may all result in a distinct feedback provided. Limitless combinations of inputs are available based on combinations of the above inputs to touchscreen 110.

This unique feedback may be established in any suitable way, such as configured by a user and/or set according to a scheme. For instance, piano notes/tones may be a first scheme, whereas acoustic guitar notes/tones may be a second scheme. One example of such scheme is a musical note scheme. These notes and/or tones may have any frequency, such as traditional music theory pitches, normally denoted by the letters (A, B, C, D, E, F and G) including accidentals and various applicable octaves. In various embodiments, two commands may be represented by the same note of varying duration. In various embodiments, two commands may be represented by the same note represented by different instrument sounds. In various embodiments, a received command may be represented by one or more combinations of tones/notes, such as a chord. Each received input to touchscreen 110 may result in feedback and/or a combination of inputs may result in feedback once all inputs in a sequence/series are registered.

Combinations of notes and timing could allow the user to build a complete set of menu actions and behaviors without requiring any visual attention to device 100. Of course, system 100 is not limited to menu actions, it may direct any command to a computer system, such as application initiation and closing, controlling settings, and/or the like. This is particularly useful for people with limited vision or people that do not wish to be visually distracted. Likewise the audio feedback can be a useful tool for reinforcement learning on menu navigation and action selection.

In various embodiments, according to aspects of the present disclosure, a user may touch touchscreen 110 in any location (within the touchscreen tactile sensing area) and feedback such as an audio note is played in response to the first touch to touchscreen 110. According to various embodiments, this initial touch location may be arbitrary. Stated another way, this initial touch may not be, and preferably, is not related to an icon displayed on touchscreen 110. This note is could be set to any sound, such as the F2 note on a piano or a dog bark at a particular pitch. According to various embodiments, in response to a user initially touching the screen this same note would is played. Thus, a user may use the feedback as a way of confirming the actions are desired actions. Thus, system 100 may accomplish reinforcement learning through feedback.

Though they may be represented by any note/tone, according to various embodiments, subsequent touches and/or inputs may result in the playing of an offset note or varying sound based on the relative offset of the subsequent touch from the original touch and/or the relative offset of the subsequent gesture from the original touch. These notes may be organized in a predictive pattern. For instance, as one travels farther away from a reference touch, notes of a higher frequency are associated with the subsequent touch. Thus, the feedback may have a predictable pattern. Also, subsequent touches above or below the reference touch may be set to a higher or lower octave and/or change in instrument or tone.

In various embodiments, this audio feedback is similar to playing different keys on a piano, although setting of the sounds can be arbitrary, relative relation between the touches could be set based on preference, and direction of offset could cause different behaviors such as shifts in key.

According to various embodiments, timing between touches, such as relative offset touches could also be used to indicate a different desired response and/or toggle between action selections. For instance, a second touch with a relative offset of 1 inch directly horizontal to the right of the first touch within a first time period between touches may result in a different response than a second touch with a relative offset of 1 inch directly horizontal to the right of the first touch with a second longer relative time period.

According to various embodiments, timing between the start of the first touch and the final touch in a series of touches taps may be used to toggle between action selections with regard to relative offset touches.

According to various embodiments, relative distance between touches may also be used to toggle between action selection and/or commands to computer based system 100 with regard to relative offset touches. For instance, a second touch with a relative offset of 1 inch directly horizontal to the right of the first touch may result in a different response than a second touch with a relative offset of 2 inches directly horizontal to the right of the first touch.

The relative direction between taps could also be used to toggle between action selections. For instance, a second touch with a relative offset of 1 inch directly horizontal to the right of the first touch may result in a different response than a second touch with a relative offset of 1 inch directly vertically above the first touch.

In general, it should be appreciated that system 100 may account for unintentional gesture drift. For instance, a second touch directly to the right of a first touch need not be precisely to the right of the first touch. For instance a user, such as a bind and/or visually impaired user, may slightly drift farther away from, nearer to, above and/or below, the intended second touch location without system 100 interpreting this as a "right and above" command versus a "to the right of the first touch command." System 100 is intended to have some flexibility to account for this anticipated drift. Moreover, system 100 may use a feedback loop to learn the user habits and account for these types of behaviors and adjust system 100 accordingly.

In various embodiments, a series of touches may result in a different action as compared with a different series of touches. According to various embodiments, a combination of touches and/or slides may result in a different action by the computer based system 100 than the same series of touches and/or slides in a different order. For instance, a second touch 1 inch directly below a first touch followed by a third touch and slide/drag in a circular motion to the right of the second touch may result in a different command to the computer based system 100 as compared with a second touch directly to the right of a first touch with a slide/drag in a circular motion followed by a third touch 1 inch directly below the initiation of the second touch.

Figure 1A:
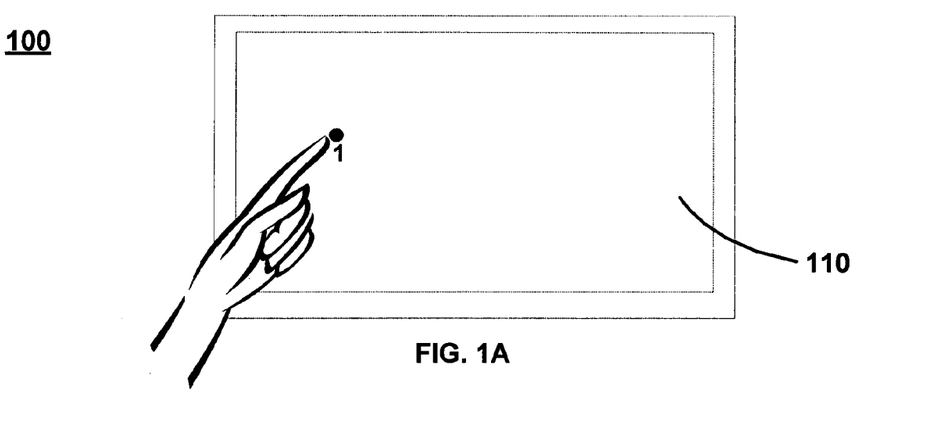
FIG. 1A depicts an initial reference input to a touch based input system according to various embodiments.
Figure 1B:
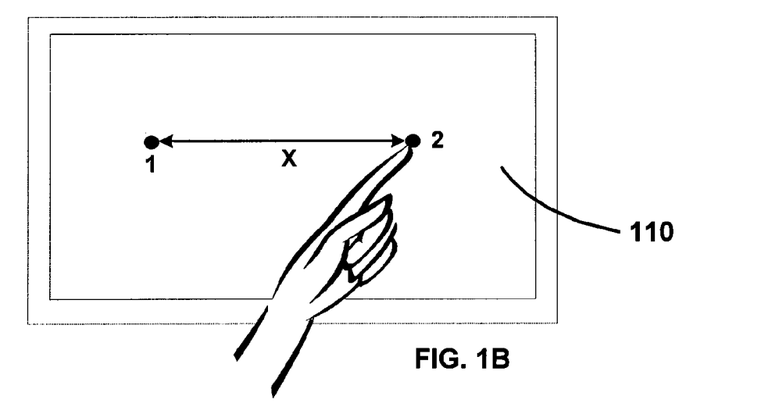
FIG. 1B depicts a second input to a touch based input system according to various embodiments.
Figure 1C:
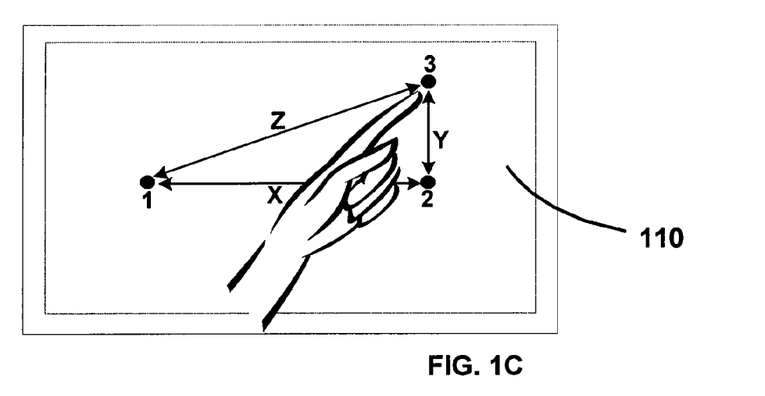
FIG. 1C depicts a third input to a touch based input system according to various embodiments.

In operation, according to various embodiments and with reference to FIGS. 1A-1C, a user may deliver an input to touchscreen 110, such as by touching touchscreen 110 at a random location $(x_1, y_1)$, for instance location 1 with the x axis being horizontal and the y axis being vertical. As disclosed herein, horizontal and vertical directions could be determined through accelerometers or set based on hardware, and/or user defined. Responsive to this touch, a note, such as note F2 is played. The user may then touch the screen at location $(x_2, y_1)$ with some relative offset in the x and/or y direction (this offset can be zero as shown in FIG. 1B with respect to the y axis) and a new note is played based on the relative offset from location 1 (distance X). For example, in the case of a positive x displacement, in this case to the right of the first touch, the note A2 could be played. Timing between the touches can also be recorded and used as information in the action and response selection. Likewise, according to various embodiments, the user may build a sequence of notes to perform a certain gesture. According to various embodiments, the user may build a sequence of touches and/or slides/drags to perform a certain gesture. The end of the series/sequence may be determined by a sufficient amount of delay with no further input. Another form of relative offset is a move in the y direction. In this case, a complete shift of key may designate the relative offset in the y direction, for example from note F2 to note F3 (See FIG. 1C to location 3). The relative offset of location 3 may be calculated from location 1 (distance Z) and/or calculated from the previous touch, such as location 2 (distance Y).

According to various embodiments, touchscreen 110 may toggle between an interface that uses visual cues, such as icons that are tapped and/or dragged to a system that uses relative offset based touch navigation. For instance, in response to a received signal, such as a user tapping the screen three times in rapid succession in the same location, icon based interaction may be temporarily disabled and relative offset navigation may be enabled. Other sources of transition (e.g. to toggle touchscreen 110 to receive relative offset commands) may include receiving speech input, selectable virtual buttons or physical buttons, such as those placed on a steering wheel or on and/or coupled to device 100. For instance, after a user toggles touchscreen 110 to receive relative offset commands (e.g. taps touchscreen 110 three times and/or a single tap and hold for a predetermined length of time), the generally selectable icons may remain visible on the touchscreen but not be responsive to a user's touch. Instead, the relative offset of a user's subsequent touches and/or cumulative gesture may be used to command the system, such as to navigate through a menu or call upon a desired application directly.

According to various embodiments, after a user toggles touchscreen 110 to receive relative offset commands, (e.g. taps touchscreen 110 three times), the generally selectable icons may disappear on the touchscreen. Then, the relative offset of a user's subsequent touches and/or cumulative gesture may be used to command the system, such as to navigate through a menu or call upon a desired application directly.

Figure 4:
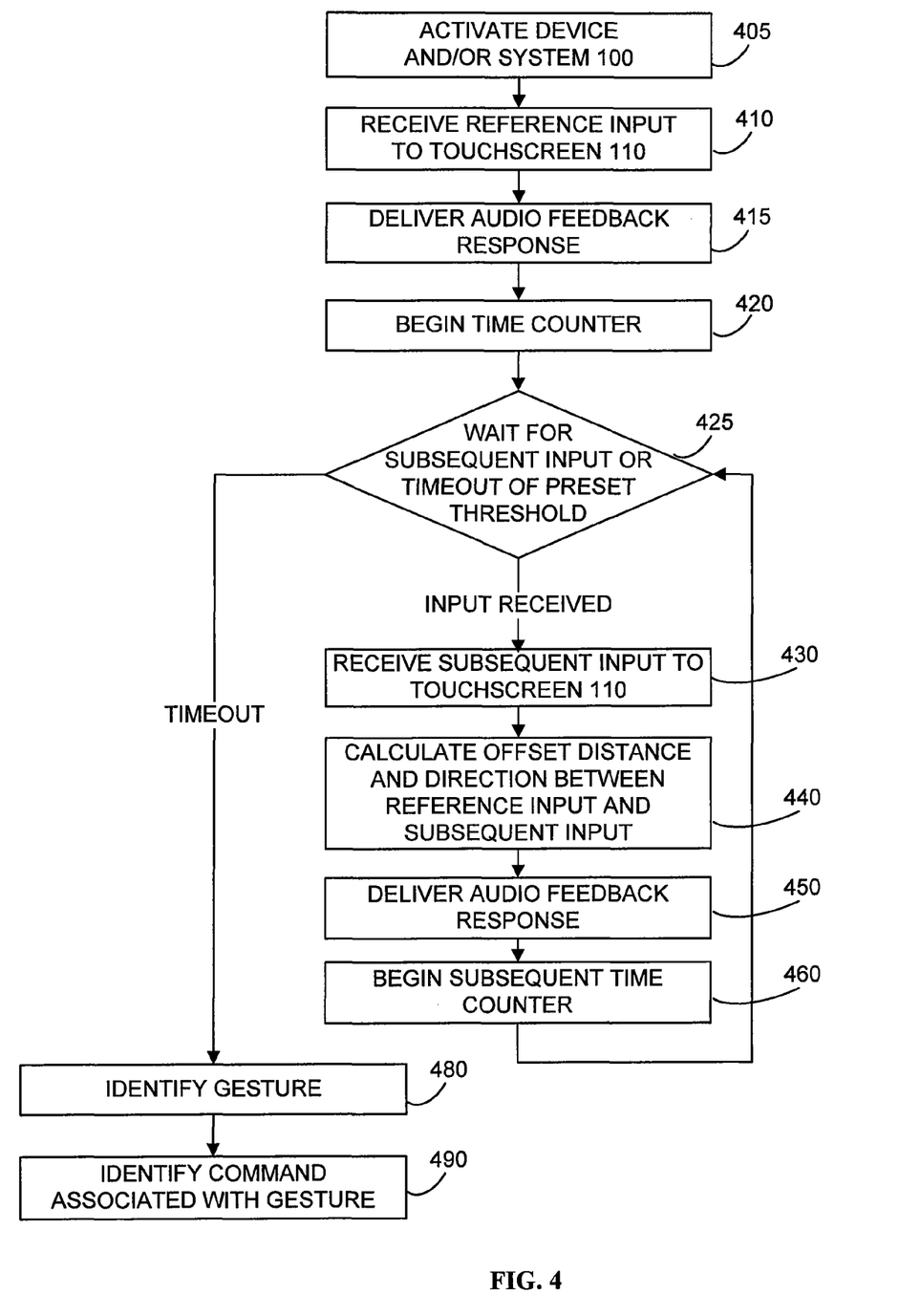
FIG. 4 illustrates a process associated with a touch based input and feedback system according to various embodiments.

According to various embodiments, and with reference to flow diagram of FIG. 4, system 100 may be activated by the user (405). This activation signal may be an external switch or button and/or a distinct input. The distinct input may be any suitable input; for example the distinct input to activate the system may be an initial touch and a hold for a period of time, a series of touches in the same location, or a distinct swipe or slide command. Also, system 100 may be set in a ready mode and not involve an activation selection prior to a reference input being received.

Once activated, system 100 may receive a reference input via touchscreen 110 (410). As disclosed herein, this reference input may be at any location within the boundaries of touchscreen 110. Stated another way, this reference input may be at a random location. For example, a reference input may be at a first location during one use and at a second, different location during a second use. In response to receiving reference input, a timer may begin (420). This timer may record the time it takes to receive a total series of inputs, the time between one or more inputs, and/or the time after an input without a subsequent input (425). Substantially concurrently with receiving the reference input, system 100 may deliver a feedback response (415). This feedback response may be an audio feedback response. This audio feedback response may be any audio feedback, but is preferably a musical note or tone. Though it could be different, preferably the note is the same note for all initial reference inputs.

Subsequent to receiving the reference input, system 100 may receive a subsequent input (430). Substantially concurrently with receiving the subsequent input, system 100 may deliver a feedback response (450). In response to receiving subsequent input, a timer may begin (460). System 100 may calculate the relative x and relative y offset of the subsequent input as compared with a prior input, such as the reference input (440). If enough time passes after a subsequent input, such as a threshold of time after a subsequent touch expiring, system 100 will perceive the series of touches complete and associate and/identify a gesture with the received inputs (425, 480). In response to identifying a gesture, a command may be initiated by system (490).

For instance, a subsequent input two units away from reference input may register as a different gesture or portion of a gesture as compared with a subsequent input one unit away from or three units away from a reference input. Similarly, a subsequent input two units away from reference input in a positive direction substantially along the x axis may register as a different gesture or portion of a gesture as compared with a subsequent input two units away from reference input in a negative direction substantially along the x axis.

As disclosed herein, a gesture may be made up of a series of touch, slides or a combination thereof. For instance and with renewed reference to FIG. 1, by way on non-limiting example, a gesture may comprise a first tap at location 1; a second touch at location 2 and a third touch at location 3. A gesture may comprise a first tap at location 1, a second touch at location 2; an additional (repeated) touch at location 2 and a fourth touch at location 3. Also, for example, another gesture may comprise a first tap at location 1; a second touch at location 2 and a third touch at location 1. Additionally, a gesture may comprise a first tap at location 1 and a second touch at location 2 with a slide to location 3. This slide from location 2 to location 3 may be by any path and various paths may comprise distinct portions of gestures. For example, an "S" sliding motion from location 2 to location 3 may be registered as a distinct command by system 100 as compared with a straight drag/slide in a direct path from location 2 to location 3. As will be appreciated, any sliding motion may be input by the system. Also, it is conceived that varying force of a touch or portions of a slide may result in a different portion of a gesture.

If the feedback provided is unexpected, a mechanism for starting over may be available. For instance, a certain input designated to erase a previous input and/or series of inputs, such as a double tap or circular slide.

Muscle memory and/or motor learning, which is a form of procedural memory that involves consolidating a specific motor task into memory through repetition may be involved in interaction with system 100. For instance, when a movement is repeated over time, such as inputting a gesture, a long-term muscle memory may be created for that task, eventually allowing it to be performed without conscious effort. This process decreases the need for attention and creates maximum efficiency within the motor and memory systems.

Figure 2:
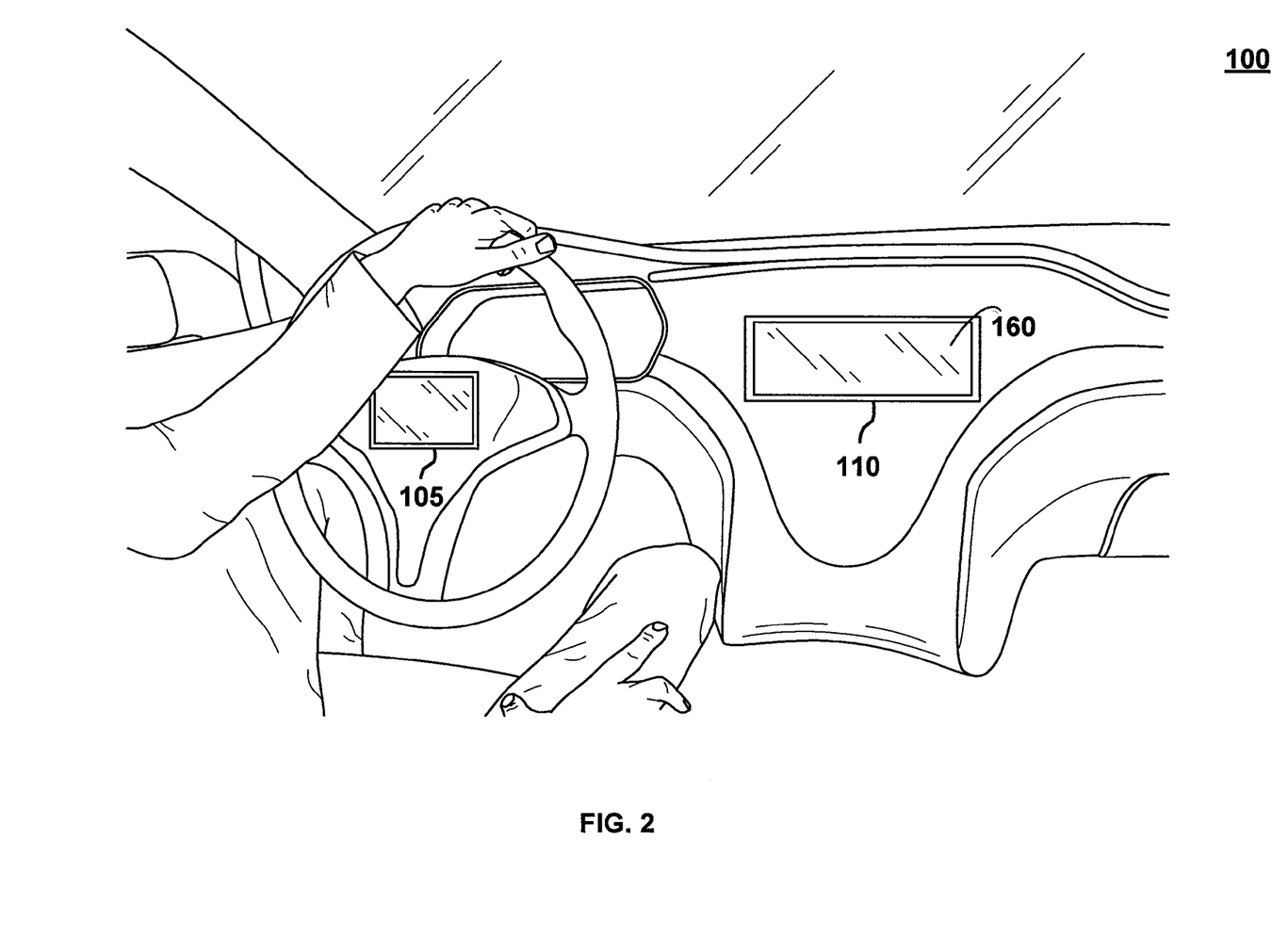
FIG. 2 illustrates various vehicular embodiments of the system according to various embodiments.

As disclosed herein, those that do not wish to be visually distracted include vehicle drivers. Thus, according to various embodiments and with reference to FIG. 2, system 100 may be integrated into an interface of a vehicle such as a control panel (e.g. a front seat control panel), touchscreen 110 and/or driver accessible touchpad 105. As shown, either touchpad 105 or touchscreen 110 may be used interchangeably and/or together to deliver input to system 100.

Aspects of the present system 100 may work in concert with voice commands. For instance, the system 100 may receive and respond to an audio command, such as a voice command. Moreover, an audio command may comprise a portion of a gesture.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The computational steps disclosed herein may be comprised in an article of manufacture including a non-transitory, tangible computer readable storage medium having instructions stored thereon.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. It should be appreciated, as used herein the terms taps, slides, drags, and touches may be used interchangeably. Further, the terms touchpad and touchscreen may be used interchangeably. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A computer-implemented user interface method for managing user inputs, the method comprising:
receiving, from a touchscreen, a location of a reference input corresponding to a first touch on the touchscreen at the location of the reference input and a location of a subsequent input corresponding to a first touch on the touchscreen at the location of the subsequent input;
receiving, from the touchscreen, the location of the reference input corresponding to a second touch on the touchscreen at the location of the reference input and the location of the subsequent input corresponding to a second touch on the touchscreen at the location of the subsequent input;
identifying, by a controller, a horizontal distance between the location of the reference input and the location of the subsequent input along a horizontal axis and a vertical distance between the location of the reference input and the location of the subsequent input along a vertical axis;
identifying, by the controller, a horizontal direction between the location of the reference input and the location of the subsequent input along the horizontal axis and a vertical direction between the location of the reference input and the location of the subsequent input along the vertical axis;
determining, by the controller, a first time duration between the first touch on the touchscreen at the location of the reference input and the first touch on the touchscreen at the location of the subsequent input and a second time duration between the second touch on the touchscreen at the location of the reference input and the second touch on the touchscreen at the location of the subsequent input, the second time duration being different than the first time duration;
associating, by the controller, the horizontal distance, the horizontal direction, the vertical distance, the vertical direction and the first time duration with a first gesture and the horizontal distance, the horizontal direction, the vertical distance, the vertical direction and the second time duration with a second gesture that is different than the first gesture;
associating, by the controller, the first gesture with a first instruction to be performed by the controller and the second gesture with a second instruction to be performed by the controller; and
determining, by the controller, an audio output based on a predictive pattern and having a first characteristic that is determined based on the horizontal distance and the horizontal direction and a second characteristic that is determined based on the vertical distance and the vertical direction.

2. The method of claim 1, further comprising:
receiving, from the touchscreen, a location of a second subsequent input;
identifying, by the controller, a second horizontal distance between the location of the subsequent input and the location of the second subsequent input along the horizontal axis and a vertical distance between the location of the reference input and the location of the subsequent input along the vertical axis; and
identifying, by the controller, a second horizontal direction between the location of the subsequent input and the location of the second subsequent input along the horizontal axis and a second vertical direction between the location of the subsequent input and the location of the second subsequent input along the vertical axis, wherein the gesture is further associated with the second horizontal distance, the second vertical distance, the second horizontal direction and the second vertical direction.

3. The method of claim 1, further comprising determining, by the controller, haptic output based on a predictive pattern and having a first characteristic that is determined based on the horizontal distance and the horizontal direction and a second characteristic that is determined based on the vertical distance and the vertical direction.

4. The method of claim 1, wherein the audio output corresponds to music notes.

5. The method of claim 1, wherein at least one of the reference input or the subsequent input includes at least one of a touch or a drag.

6. The method of claim 1, wherein the reference input is not associated with an image displayed on the touchscreen.

7. The method of claim 1, wherein the touchscreen is an interface of at least one of a vehicle, a robot, a home appliance, a tool or a toy.

8. The method of claim 1, further comprising toggling, by the controller, the touchscreen between a selectable icon touchscreen interface and a relative offset measuring interface and wherein the relative offset measuring interface is not associated with icons displayed on the touchscreen.

9. The method of claim 1, wherein the location of the reference input on the touchscreen is the same as a location of a displayed selectable icon on the touchscreen and selection of the displayed selectable icon is unaffected by detection of the reference input and the subsequent input.

10. A computer-implemented user interface comprising:
a touchscreen configured to detect a first touch at a reference location, a first touch at a subsequent location, a second touch at the reference location and a second touch at the subsequent location;
a controller configured to:
determine a horizontal distance between the reference location and the subsequent location along a horizontal axis and a vertical distance between the reference location and the subsequent location along a vertical axis, determine a horizontal direction between the reference location and the subsequent location along the horizontal axis and a vertical direction between the reference location and the subsequent location along the vertical axis, determine a first time duration between the first touch at the reference location and the first touch at the subsequent location and a second time duration between the second touch at the reference location and the second touch at the subsequent location, the second time duration being different than the first time duration;

associate the horizontal distance, the horizontal direction, the vertical distance and the vertical direction with a gesture, associate the gesture with an instruction to be performed by the controller, determine a first audio output based on a predictive pattern, the horizontal distance, the horizontal direction, the vertical distance, the vertical direction and the first time duration, and determine a second audio output that is different than the first audio output based on the predictive pattern, the horizontal distance, the horizontal direction, the vertical distance, the vertical direction and the second time duration; and a speaker configured to output the first audio output in response to the first touch at the subsequent location being detected and to output the second audio output in response to the second touch at the subsequent location being detected.

11. The user interface of claim 10, further comprising a vibration unit configured to output a first haptic output and a second haptic output, wherein the controller is further configured to determine the first haptic output based on the predictive pattern, the horizontal distance, the horizontal direction, the vertical distance, the vertical direction and the first time duration and to determine the second haptic output based on the predictive pattern, the horizontal distance, the horizontal direction, the vertical distance, the vertical direction and the second time duration.

12. The user interface of claim 10, wherein the audio output corresponds to music notes.

13. A non-transitory computer-readable medium having stored thereon sequences of instructions, the sequences of instructions including instructions which in response to execution by a processor causes the processor to perform the steps of:

receiving a location of a reference input corresponding to a first touch at the location of the reference input from a touchscreen;

receiving a location of a first subsequent input corresponding to a first touch at the location of the subsequent input from the touchscreen;

receiving the location of the reference input corresponding to a second touch at the location of the reference input from the touchscreen;

receiving the location of the first subsequent input corresponding to a second touch at the location of the subsequent input from the touchscreen;

receiving a location of a second subsequent input from the touchscreen;

determining a first horizontal distance between the location of the reference input and the location of the first subsequent input along a horizontal axis and a first vertical distance between the location of the reference input and the location of the first subsequent input along a vertical axis;

determining a second horizontal distance between the location of the first subsequent input and the location of the second subsequent input along the horizontal axis and a second vertical distance between the location of the first subsequent input and the location of the second subsequent input along the vertical axis;

determining a first horizontal direction between the location of the reference input and the location of the first subsequent input along the horizontal axis and a first vertical direction between the location of the reference input and the location of the first subsequent input along the vertical axis;

determining a second horizontal direction between the location of the first subsequent input and the location of the second subsequent input along the horizontal axis and a second vertical direction between the location of the first subsequent input and the location of the second subsequent input along the vertical axis;

determining a first time duration between the first touch on the touchscreen at the location of the reference input and the first touch on the touchscreen at the location of the first subsequent input and a second time duration between the second touch on the touchscreen at the location of the reference input and the second touch on the touchscreen at the location of the first subsequent input, the second time duration being different than the first time duration;

associating the first horizontal distance, the first vertical distance, the second horizontal distance, the second vertical distance, the first horizontal direction, the first vertical direction, the second horizontal direction, the second vertical direction and the first time duration with a first gesture;

associating the first horizontal distance, the first vertical distance, the second horizontal distance, the second vertical distance, the first horizontal direction, the first vertical direction, the second horizontal direction, the second vertical direction and the second time duration with a second gesture;

associating the first gesture with a first instruction to be performed by the processor;

associating the second gesture with a second instruction to be performed by the processor; and determining audio output based on the gesture.

14. The computer-readable medium of claim 13, further comprising determining haptic output based on the gesture.

15. The computer-readable medium of claim 13, wherein the audio output corresponds to music notes.

16. A computer-implemented user interface method for managing user inputs, the method comprising:

receiving, from a touchscreen, a location of a reference input corresponding to a first touch on the touchscreen at the location of the reference input;

receiving, from the touchscreen, a location of a first subsequent input corresponding to a first touch on the touchscreen at the location of the first subsequent input;

receiving, from a touchscreen, a location of a reference input corresponding to a second touch on the touchscreen at the location of the reference input;

receiving, from the touchscreen, a location of a first subsequent input corresponding to a second touch on the touchscreen at the location of the first subsequent input;

receiving, from the touchscreen, a location of a second subsequent input;

identifying, by a controller, a first horizontal distance between the reference input and the first subsequent input along a horizontal axis and a first vertical distance between the location of the reference input and the location of the first subsequent input along a vertical axis;

identifying, by the controller, a second horizontal distance between the first subsequent input and the second subsequent input along the horizontal axis and a second vertical distance between the location of the first subsequent input and the location of the second subsequent input along the vertical axis;

identifying, by the controller, a first horizontal direction between the reference input and the first subsequent input along the horizontal axis and a first vertical direction between the location of the reference input and the location of the first subsequent input along the vertical axis;

identifying, by the controller, a second horizontal direction between the first subsequent input and the second subsequent input along the horizontal axis and a second vertical direction between the location of the first subsequent input and the location of the second subsequent input along the vertical axis;

determining, by the controller, a first time duration between the first touch on the touchscreen at the location of the reference input and the first touch on the touchscreen at the location of the first subsequent input and a second time duration between the second touch on the touchscreen at the location of the reference input and the second touch on the touchscreen at the location of the first subsequent input the second time duration being different than the first time duration;

associating, by the controller, the first horizontal distance, the first vertical distance, the second horizontal distance, the second vertical distance, the first horizontal direction, the first vertical direction, the second horizontal direction, the second vertical direction and the first time duration of the received inputs with a first gesture;

associating, by the controller, the first horizontal distance, the first vertical distance, the second horizontal distance, the second vertical distance, the first horizontal direction, the first vertical direction, the second horizontal direction, the second vertical direction and the second time duration of the received inputs with a second gesture that is different than the first gesture;

associating, by the controller, the first gesture with a first instruction to be performed by the controller;

associating, by the controller, the second gesture with a second instruction to be performed by the controller; and determining, by the controller, an audio output based on a predictive pattern, the first horizontal distance, the first vertical distance, the second horizontal distance, the second vertical distance, the first horizontal direction, the first vertical direction, the second horizontal direction and the second vertical direction.

17. The method of claim 16, further comprising determining, by the controller, haptic output based on the predictive pattern, the first horizontal distance, the first vertical distance, the second horizontal distance, the second vertical distance, the first horizontal direction, the first vertical direction, the second horizontal direction and the second vertical direction.

18. The method of claim 16, wherein at least one of the reference input, the first subsequent input or the second subsequent input includes at least one of a touch or a drag.

19. The method of claim 16, further comprising toggling, by the controller, the touchscreen between a selectable icon touchscreen interface and a relative offset measuring interface and wherein the relative offset measuring interface is not associated with icons displayed on the touchscreen.

* * * * *